Patented June 6, 1950

2,510,534

UNITED STATES PATENT OFFICE 2,510,534

PROCESS OF PREPARING PEANUTS

Walter L. Whitehead, Cottondale, Fla.

No Drawing. Application January 28, 1949,
Serial No. 73,450

2 Claims. (Cl. 99—127)

This invention relates to a process of cooking, salting and storing unshelled green peanuts, and a product resulting from such process.

At the present time, there are two well-known accepted processes of preparing peanuts for commercial use and consumption. One commercial process is to wash the unshelled peanuts after they have been dug from the ground, spread the washed unshelled peanuts in the open air and direct sunlight to dry the nut or kernel, shell the peanuts, fry the shelled nuts in deep fat to cook the same, after which the peanuts are salted. From a commercial standpoint, one of the problems existing with this process, besides the time and expense involved, is the fact that the fried salted peanuts must either be consumed shortly after they have been so treated, or they must be stored in air-tight moisture-proof containers, because otherwise the nuts become stale and/or the fat appearing on the surface thereof becomes rancid.

The other commercial process of treating peanuts is to harvest and dry the nuts in a manner as aforementioned, after which the dried unshelled nuts may be heated for a sufficient length of time to roast the same. In this last-mentioned commercial process the peanut will shrink considerably in the drying and roasting process, and after the roasting takes place, the unshelled peanut must either be consumed shortly after roasting or, again, maintained in a closed, sealed container. As the roasting of the unshelled peanuts will dry the shell and make the same porous, atmospheric conditions easily penetrate the shell and render the peanut stale if not properly protected.

The main object of this invention is to treat a green unshelled peanut in a manner so that the product resulting from such treatment will be in a new edible form and wherein the product may be maintained in such form over long periods of time.

Another object of this invention is to treat a green unshelled peanut so that the same will be cooked and salted and wherein the unshelled peanut will be edible even though stored over long periods of time.

Still another object of the invention is to enable unshelled peanuts which have been cooked and salted to be stored and transported without danger of the same becoming stale or rancid.

A further object of the invention is to provide a process wherein the green unshelled peanuts may be cooked, salted and stored immediately after harvesting and washing, without the delay and expense of drying the peanuts, and wherein the so-treated peanuts will be maintained in an edible condition.

In carrying out the invention, green peanuts are harvested in the usual manner, after which they are washed or cleansed of dirt. Immediately after the shells have been washed, the green unshelled peanuts are placed within a container, such as a glass jar, tin can or the like. The container may be of any suitable size, although it is preferable that the size of the container be such that the container with the nuts therein may be sold to the ultimate consumer. Accordingly, a pint sized container is considered preferable, although not necessary. After the green unshelled peanuts have been placed in the container to substantially fill the same, common table salt (NaCl) is added to the container in a proportion of substantially one tablespoonful of salt to a pint of green unshelled peanuts. Thereafter, sufficient water is added to the container to completely cover all of the unshelled peanuts contained therein. After the water has been added to the container to form a salt water solution, in substantially the concentration aforementioned, the container must then be closed and sealed and be made air-tight. After the container has been so closed and sealed, the container having the salt water solution and peanuts therein is heated to a temperature sufficiently high to boil the salt water solution. The boiling should continue for a sufficient length of time to cook the green nuts and, at the same time, enable the salt water solution to penetrate the shell to thus salt the nuts. If the sealed container is placed over open heat, the boiling should continue for approximately three hours; whereas, if the sealed container is placed in a pressure cooker, the boiling of the salt water solution within the container may be discontinued after approximately one hour.

After the boiling of the salt water has ceased and the peanuts have been cooked, the container may be transferred from the source of heat and be permitted to cool to atmospheric temperature. The sealed container having the cooked, salted unshelled peanuts and salt water solution therein may then be transported and/or stored, and the peanuts will be maintained in an edible condition over a long period of time. However, once the container has been opened and the unshelled peanuts are removed from the salt water solution, they should be consumed within a reasonable time, such time normally being commensurate with that allowed between the completion of the two known aforementioned commercial processes and the consumption of the peanuts.

The peanut, when consumed, may be shelled in the usual manner. It will be noted that the shell of the peanut closely embraces the nut kernel and, hence, there is no loss of space as is normally true when unshelled peanuts are treated in the known commercial manner. It will be noted also that the peanuts are well-cooked and salted and are tender and flavorful to the taste.

By following the above process, the time and expense normally incurred in either of the other aforementioned commercial processes of drying the washed peanuts is eliminated, thus considerably cheapening the process of treating the peanuts and, hence, enabling the cooked, salted unshelled peanuts to reach the consumer at a cost considerably less than heretofore.

I claim:

1. A process of cooking, salting and storing green unshelled peanuts wherein the unshelled peanuts will be cooked, salted and maintained in an edible condition over long periods of time, which includes the steps of placing washed green unshelled peanuts in a container, adding salt water to the container in a quantity sufficient to cover the peanuts, closing and sealing the container, heating the container to boil the salt water while the container is maintained in a sealed condition for a sufficient length of time to cook the unshelled green peanuts, thereafter permitting the peanuts and salt water to cool and maintaining the cooked unshelled peanuts and salt water in said container while said container is maintained in a sealed condition until the peanuts are ready for consumption.

2. A process of cooking, salting and storing green unshelled peanuts wherein the unshelled peanuts will be cooked, salted and maintained in an edible condition over long periods of time, which includes the steps of placing washed green unshelled peanuts in a container, adding salt to the container in the proportion of approximately one tablespoonful of salt to one pint of unshelled peanuts, adding sufficient water to the container to cover the unshelled peanuts, closing and sealing the container, heating the container to boil the salt water while the container is maintained in a sealed condition for a sufficient length of time to cook the unshelled green peanuts, thereafter permitting the peanuts and salt water to cool and maintaining the cooked unshelled peanuts and salt water in said container while said container is maintained in a sealed condition until the peanuts are ready for consumption.

WALTER L. WHITEHEAD.

REFERENCES CITED

The following references are of record in the file of this patent:

UNITED STATES PATENTS

| Number | Name | Date |
|---|---|---|
| 966,514 | Baker et al. | Aug. 9, 1910 |
| 1,074,856 | Frestadins | Oct. 7, 1913 |
| 1,390,703 | Hansen | Sept. 13, 1921 |
| 1,585,128 | Smith | May 18, 1926 |
| 1,637,068 | Willison | July 26, 1927 |